(12) United States Patent
Ludwig et al.

(10) Patent No.: US 10,886,687 B2
(45) Date of Patent: Jan. 5, 2021

(54) ELECTRICAL CONTACT ELEMENT TO IMPROVE OPERATIONAL FUNCTION

(71) Applicant: Robert Bosch GmbH, Stuttgart (DE)

(72) Inventors: Ronny Ludwig, Reutlingen (DE); Rolf Dootz, Madrid (ES)

(73) Assignee: Robert Bosch GmbH, Stuttgart (DE)

( * ) Notice: Subject to any disclaimer, the term of this patent is extended or adjusted under 35 U.S.C. 154(b) by 127 days.

(21) Appl. No.: 16/076,736

(22) PCT Filed: Jan. 30, 2017

(86) PCT No.: PCT/EP2017/051897
§ 371 (c)(1),
(2) Date: Aug. 9, 2018

(87) PCT Pub. No.: WO2017/137273
PCT Pub. Date: Aug. 17, 2017

(65) Prior Publication Data
US 2019/0044298 A1    Feb. 7, 2019

(30) Foreign Application Priority Data

Feb. 12, 2016   (DE) .................... 10 2016 202 184

(51) Int. Cl.
*G01H 11/08* (2006.01)
*H01R 43/16* (2006.01)
(Continued)

(52) U.S. Cl.
CPC ............. *H01R 43/16* (2013.01); *G01H 11/08* (2013.01); *H01R 4/02* (2013.01); *H01R 12/585* (2013.01);
(Continued)

(58) Field of Classification Search
None
See application file for complete search history.

(56) References Cited

U.S. PATENT DOCUMENTS

| 5,074,039 A | 12/1991 | Hillbish et al. |
| 2004/0266272 A1 | 12/2004 | Maruyama et al. |

(Continued)

FOREIGN PATENT DOCUMENTS

| WO | 2009071381 | 6/2009 |
| WO | 2014068005 | 5/2014 |

OTHER PUBLICATIONS

International Search Report for Application No. PCT/EP2017/051897 dated Mar. 24, 2017 (English Translation, 3 pages).

*Primary Examiner* — Lisa M Caputo
*Assistant Examiner* — Nigel H Plumb
(74) *Attorney, Agent, or Firm* — Michael Best & Friedrich LLP (57) ABSTRACT

A contact element (30'), including a base body made of a strip material and/or sheet material, and at least one contact segment (30.1, 30.2') which is connected to the base body and which is designed to make electric contact between the contact element (30') and a contact partner, in particular an electric and/or electronic component. The at least one contact segment (30.2') is embodied as a wire-like extension, which is formed integrally with the base body from the strip and/or sheet material. In addition, at least one end of the wire-like extension forms a transition region (31), which adjoins the base.

22 Claims, 4 Drawing Sheets

(51) Int. Cl.
*H01R 4/02* (2006.01)
*H01R 13/03* (2006.01)
*H01R 13/41* (2006.01)
*H01R 12/58* (2011.01)
*H01R 13/24* (2006.01)
*H01R 4/04* (2006.01)

(52) U.S. Cl.
CPC .............. *H01R 13/03* (2013.01); *H01R 13/41* (2013.01); *H01R 4/029* (2013.01); *H01R 4/04* (2013.01); *H01R 13/2428* (2013.01)

(56) References Cited

U.S. PATENT DOCUMENTS

| | | |
|---|---|---|
| 2014/0087592 A1 | 3/2014 | Endo et al. |
| 2014/0199861 A1 | 7/2014 | Mattiuzzo |

ELECTRICAL CONTACT ELEMENT TO IMPROVE OPERATIONAL FUNCTION

BACKGROUND OF THE INVENTION

The invention relates to a contact element, to a sensor comprising the contact element, and also to a method for forming the contact element.

By way of example, sensors which are electrically contact-connected to a printed circuit board, which has corresponding sensor electronics, by means of a contact element for the purpose of making contact with the customer plug interface in the housing interior are known in various applications. Here, the contact element comprises contact segments which can be provided in various embodiments for the purpose of forming the electrical contact-connection. Exemplary embodiments include press-in contacts, soldered contacts, welded contacts or bonded contacts.

Figure 1A:
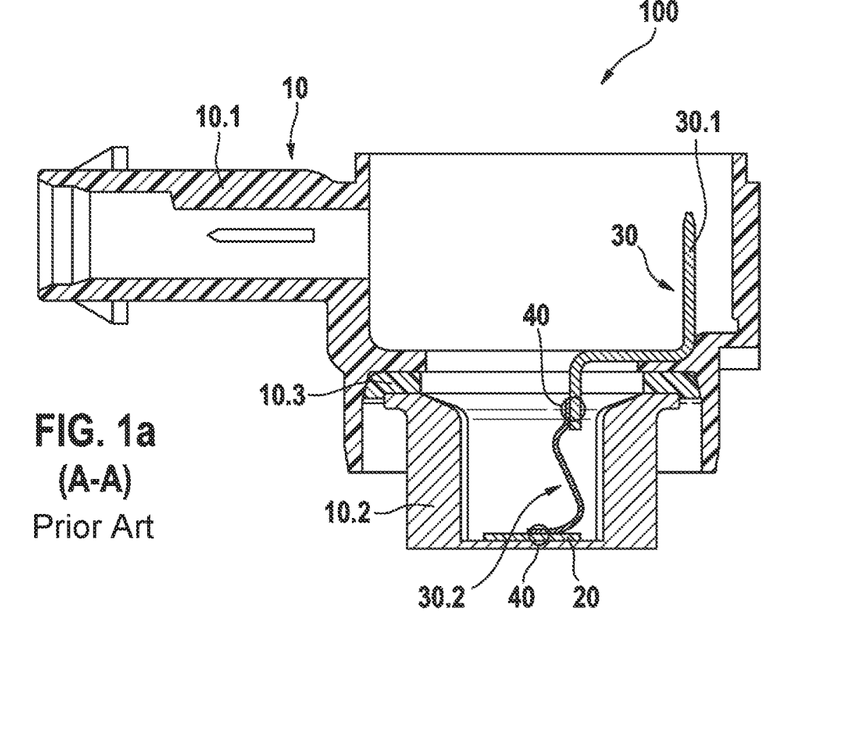
FIG. 1a: shows a sectioned side view of an ultrasonic sensor which is known according to the prior art.
Figure 1B:
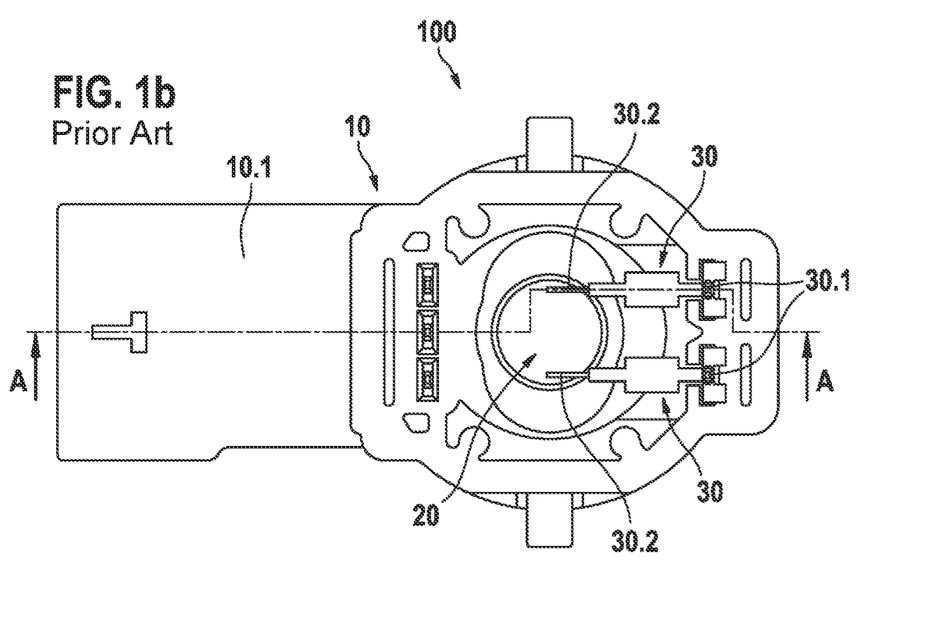
FIG. 1b: shows a plan view of the ultrasonic sensor from FIG. 1a, FIG. 2: shows a sectional illustration through the side of a detail of an ultrasonic sensor comprising a sensor element with which contact is made by means of a contact element according to the invention.

FIGS. 1a and 1b show a sectioned side view and a plan view of an ultrasonic sensor 100 which is known according to the prior art. An ultrasonic sensor 100 of this kind comprises a sensor housing 10 which is of multipartite design, for example is composed of a main housing 10.1 and a metal diaphragm pot 10.2 which is attached at the bottom side by means of a fitting and/or decoupling ring 10.3. A piezo oscillator in the form of a sensor element 20 is arranged on the base in the interior of the metal diaphragm pot 10.2. Furthermore, two contact elements 30, which respectively connect corresponding electrodes of the sensor element 20 to a printed circuit board of a sensor electronics unit (not illustrated), are fitted in the main housing 10.1. A contact element 30 of this kind is, for example, in the form a stamped and bent part and has a contact segment 30.1 which is in the form of a press-in pin 30.1. Said press-in pin establishes an electrical contact-connection to the printed circuit board by way of forming a press-in contact. Since the piezo oscillator 20 cannot be directly connected to a solid main body of the contact element 30 on account of its size and interface and also for functional reasons (for example acoustic damping), electrical contact is made between the contact element 30 and the piezo oscillator 20 by means of a thin, for example 80 μm-thick, Cu wire which therefore forms a further contact segment 30.2 of the contact element 30 in the form of a contact wire.

This Cu wire 30.2 can be attached both to the solid main body of the contact element 30 and also to the piezo oscillator 20 by means of a selective soldering process. As an alternative, it is possible to establish an electrical contact-connection by means of a bonding and welding process, such as thermal compression welding for example. Therefore, an electrical contact connection of this kind is in the form of a soldered or thermally welded contact 40, for example. In a fitted state of the ultrasonic sensor 100, the Cu wire has a curved S profile in order to effect mechanical and/or acoustic decoupling from the contact element 30.

Since both the soldering and also the thermal compression welding as well as the forming of the corresponding wire loop can be performed only outside the preassembled sensor housing on account of the narrow installation space conditions, the entire process control operation is very complicated and additionally requires very expensive manufacturing technology. Decoupling of the various process steps is not possible in this case either.

A coupled process sequence of this kind is as follows:
A) positioning 2 contact elements 30 and the piezo oscillator 20 outside the sensor housing 10 on a corresponding flat support
B) cutting Cu-coated wire segments to length and positioning them in relation to a main body of the contact element 30 and to the piezo oscillator 20 in each case
C) thermal compression welding the Cu wire 30.2 so as to respectively form a thermally welded contact 40 on one side with respect to the main body of a respective contact element 30 and on the other side with respect to the piezo oscillator 20
D) bending the two contact elements 30 through 90° relative to the piezo oscillator 20, wherein wire loops are formed in the Cu wires 30.2 at the same time in the process
E) simultaneously fitting the two contact elements 30 and also the piezo oscillator 20 into a preassembled sensor housing 10 which comprises at least the main housing 10.1, the metal diaphragm pot 10.2 and the fitting ring and/or the decoupling ring 10.3.

Manufacturing complexity of this kind results in a comparable manner when contact-connecting different types of sensors which do not permit contact-connection by a solid contact element for structural reasons or functional reasons.

SUMMARY OF THE INVENTION

The invention is based on the object of simplifying contact-connection of sensors and of reducing manufacturing complexity for the sensors.

This object is achieved by a contact element, by a sensor comprising the contact element, and also by a method for forming the contact element having the characterizing features of the independent claims.

The invention proceeds from a contact element, comprising a main body, which is composed of a strip material and/or sheet material, and at least one contact segment which is connected to the main body and is designed to electrically contact-connect the contact element to a contact partner, in particular an electrical and/or electronic component. In this case, the at least one contact segment is embodied as a wire-like projection which is integrally formed with the main body which is composed of the strip material and/or sheet material. Furthermore, the wire-like projection, by way of at least its one end, forms a transition region which adjoins the main body. In this way, for example, the contact wire 30.2 shown in FIGS. 1a and 1b for making contact with a sensor element 20 used previously is substituted by the wire-like projection and is integrally formed in the contact element as a contact segment. This has the advantage that a previous requirement for an otherwise existing connecting point within the contact element itself is dispensed with. This leads to a considerably simplified process sequence for forming a sensor in which a sensor element is electrically contact-connected to the contact element. Therefore, in this respect, individual process steps from amongst the abovementioned process steps A) to E) can be dispensed with and/or decoupled from one another as compared to the previous prior art. An additional advantage is that, for the purpose of contact-connecting the contact element overall to, for example, one sensor element, a suitable connection technique is now defined only depending on the main material of the strip material and/or sheet material, as a result of which a greater freedom of choice is provided. Manufacturing methods which allow sheet parts, in particular composed of thin-walled sheets with a sheet thickness of from 0.2 mm to 2 mm, preferably with a thickness of from 0.4 mm to 0.8 mm, to be formed using a cutting process for example, can be used for the purpose of producing the wire-like projection and/or the contact element overall. The contact element is preferably in the form of a stamped or a lasered sheet part.

Advantageous developments of and improvements to the contact element according to the invention are possible owing to the measures presented in the dependent claims.

One advantageous embodiment of the contact element provides that the wire-like projection, by way of its other end, forms a contact foot, which is free from the main body, for the purpose of making contact with a further contact partner. Therefore, all contact-making options which are generally already available for wire contacts are still open to the contact element. In addition to an electrical contact-connection being formed in a simple manner, mechanical decoupling between the solid main body of the contact element and the electrically contact-connected contact partner is achieved by the section which is located between the contact foot and the transition region of the wire-like projection. In the case of a contact-connected ultrasonic sensor element, damping of transmitting acoustic oscillations is achieved in this way, as a result of which fault-free operational functioning of the sensor element is ensured.

In a development of the contact element, it is provided that the contact foot is selectively coated, in particular with at least one layer which is composed of Ni, Au, Ag and/or Sn. A layer of this kind can be applied by electroplating, for example. An electrical contact-connection which is suitable for a material of the contact partner with which contact is to be made and for a connection technique which is provided for the contact-connection can be improved by providing for selective coating of this kind.

A further improvement is the result of the contact segment in the form of the wire-like projection being in the form of a spring element. As the spring element, the wire-like projection has a degree of elastic flexibility under mechanical loading, the purpose of the degree of elastic flexibility being to preclude plastic deformation, depending on the application. The abovementioned mechanical decoupling is further optimized in this way. In the prior art according to FIGS. 1a and 1b, mechanical decoupling of this kind is achieved by a curved shape profile of the wire contact used in that case. However, the curved shape profile is established only in a final fitting state by a previously straight wire element being placed under prestress during a fitting operation. A permanent action of force remains applied to the contact-connected sensor element as a result. Furthermore, a shape profile of this kind which is produced for the first time cannot be identically reproduced on account of dependencies in the fitting process. The wire-like projection advantageously already exhibits a shape profile which differs from a straight shape profile. In particular, this shape profile is formed in a plane which corresponds to the original plane of the strip material and/or sheet material. It has proven advantageous when the spring element is preferably formed by a curved profile of the wire-like projection, in particular in the form of an S shape. Overall, this results in a high degree of design freedom in respect of the shaping of a spring element of this kind, wherein said spring element can be formed as often as desired in a substantially identical manner by a constantly fixed shaping. In particular, this means the shaping is no longer dependent on a fitting process, as a result of which a high degree of process reliability during use of the contact element is provided. In addition, in this way, a connection technique using a connecting medium which is not immediately curable, such as a conductive adhesive for example, can be used for contact-connecting the contact element to a contact partner since now only low prestressing forces or no prestressing forces at all act at the connecting point even in a final fitting state.

In a preferred embodiment, the strip material and/or sheet material of the contact element is formed from an, in particular rolled, bronze alloy, for example from CuSn6. A material of this kind generally has a high degree of spring stiffness and has proven suitable for the use of press-in contacts for example. Given provision of the wire-like projection, said wire-like projection exhibits much stronger elastic properties overall than, for example, a wire contact which is composed of Cu, as a result of which the design as a spring element is further optimized.

In a development of the contact element, a thickness dimension of the strip material and/or sheet material in the region of the contact segment is reduced by at least a factor of from 1.5 to 10, preferably by a factor of from 4 to 6, in comparison to the main body. In this way, a thickness dimension for the wire-like projection can be dimensioned in a manner corresponding to a dimension of a wire contact which is otherwise used. The factor becomes increasingly larger with larger thickness dimensions of the strip material and/or sheet material. The reduced thickness dimension is preferably defined in a range of between 0.05 mm and 0.5 mm, preferably in a range of between 0.05 mm and 0.3 mm. A reduction in the thickness dimension can be achieved, in particular, by a single-stage or multi-stage embossing process. In this context, at least one embossed step is formed in the transition region of the wire-like projection. Impressing the strip material and/or sheet material additionally results in material solidification, as a result of which the wire-like projection exhibits a high mechanical load-bearing capacity in spite of having thin walls.

In the manner of a wire contact, a width dimension of the wire-like projection is, in particular, 1 to 2 times, preferably 1.5 times, its thickness dimension. In the majority of embodiments, a rectangular and/or square cross-sectional shape of the wire-like projection which is produced simply, for example, by a cutting process which is directed perpendicular to the plane of the strip material and/or sheet material should be sufficient. A thickness dimension and width dimension are unambiguously specified by a cross-sectional shape of this kind. A different cross-sectional shape can also be obtained on account of an embossing process, for example by virtue of chamfers or rounded portions. In these cases, the thickness dimensions and width dimensions are produced by the edge dimensions of a rectangle which is arranged in an imaginary manner perpendicular to one of the side faces of the strip material and/or sheet material and perpendicular to a longitudinal extent of the wire-like projection and which surrounds the cross-sectional shape such that it is in contact with the outer edges.

In an advantageous development, in addition to the contact segment which is in the form of a wire-like projection, the contact element furthermore, in particular in a manner likewise integrally formed with the main body, comprises a joining facility and/or latching facility for mechanically fitting the contact element into a housing and/or at least one further contact segment, wherein the at least one further contact segment is in the form of a press-in contact. The press-in contact can be formed by manufacturing methods, which are otherwise known, within the strip material and/or sheet material. Since material solidification occurs with the reduction in the thickness dimension in the region of the wire-like projection, it is necessary, for example in the case of a bronze main material of the strip material and/or sheet material, to select only a low hardness (for example R350/

H080 or R420/H125) for said material in the starting state, said material still being sufficient for the functioning of the press-in contact however.

The invention also leads to a sensor, comprising a sensor housing, a sensor element and a contact element according to the invention in one of the above-described embodiments. Here, the contact segment makes electrical contact with the sensor element, in particular by means of the contact foot of the wire-like projection. By way of example, the sensor can be in the form of an ultrasonic sensor which comprises, in particular, a piezo oscillator as the sensor element. Here, transmitting acoustic oscillations between the main body of the contact element and the sensor element can be effectively damped by means of the wire-like projection. Furthermore, fitting is very simple in comparison to previously known designs of comparable sensors owing to a reduced number of connecting points for forming an electrical contact-connection. Furthermore, fitting is advantageous on account of the fact that contact can be made with the sensor element in a preassembled state within a sensor housing with narrow installation space conditions. It is merely necessary to bring the contact foot at the exposed end of the wire-like projection into physical contact with a connection region of the sensor element and to establish a permanent contact-connection using a suitable connecting technique. For this purpose, the contact segment is particularly preferably cohesively connected to the connection region of the sensor element, in particular by means of a soldered connection, adhesive connection, bonded connection or welded connection. A silver conductive adhesive is particularly suitable for an adhesive connection, primarily when the connection region of the sensor element is already silver-coated.

In an advantageous embodiment, the sensor housing comprises a diaphragm pot which is arranged at the bottom side in relation to a main housing. Here, the sensor element is fastened to the base, in particular connected to the base by means of an adhesive layer. The diaphragm pot is preferably at least partially filled with a potting compound, for example a silicone foam, for the purpose of protecting the sensor element. If a conductive adhesive is used for the purpose of making contact with the sensor element, synergies with the following potting process can be used. Filling the diaphragm pot, for example with a silicone foam, requires a thermal curing process. If there are no chemical interactions between the conductive silver adhesive and the silicone foam, the two materials can be cured in a wet-to-wet manner using the same thermal treatment step.

In an advantageous embodiment, the contact element is fitted to the sensor housing by means of the joining facility and/or latching facility and/or the press-in contact of the further contact segment makes contact with a printed circuit board. The printed circuit board is, in particular, part of a sensor electronics circuit.

The invention further leads to a method for forming a contact element from a strip material and/or sheet material, in particular a contact element according to the invention in line with one of the above-described embodiments. Here, it is provided that the contact element comprising a main body and a wire-like projection which adjoins the main body is integrally formed from the strip material and/or sheet material. Furthermore, the method comprises at least one cutting process and one shaping process, wherein an outer contour of the contact element is obtained by way of the at least one cutting process and a thickness dimension of the strip material and/or sheet material in the region of the wire-like projection is reduced in comparison to the main body by way of the at least one shaping process. A compact contact element which, in addition to a solid main body, integrally comprises a wire contact can be produced in an advantageous manner. In this way, manufacturing complexity for forming a contact element for the purpose of making contact with a contact partner by means of a wire contact is considerably reduced, as a result of which costs for further manufacturing devices which are otherwise required can be dispensed with.

A particularly advantageous embodiment of the method provides that the outer contour and the thickness dimension in the region of the wire-like projection are obtained by means of a multi-stage cutting process and shaping process. Here, a preliminary contour is formed as a wider preliminary cut of the outer contour at least in a first cutting process and an end contour of the outer contour is formed at least in a last cutting process. Furthermore, after the first cutting process and before the last cutting process, the thickness dimension is reduced starting from a first shaping process, over a plurality of step dimensions, down to an end dimension in the last shaping process. A shaping process for reducing the thickness dimension results in lateral flowing of the strip material and/or sheet material, as a result of which subsequent cutting of the width dimension is required. The shaping process furthermore also leads to material solidification or material hardening. As the material solidification or material hardening increases, the step dimensions are preferably decreased with each subsequent shaping process. As a result, it is possible overall to produce the contact segment in the form of the wire-like projection with a high degree of precision in respect of dimensions. An additional effect is that, owing to the resulting material solidification, a contact segment which can be subject to high mechanical loading can be produced.

A very simple and cost-effective method is produced on account of the cutting process being performed by a stamping operation and/or the shaping process being performed by an embossing operation.

In a particular embodiment, it is provided that a plurality of contact elements are formed in the form of a stamping strip assembly in a continuous stamping strip. Here, each contact element is still held in the stamping strip assembly by means of at least one connecting point which is composed of the strip material and/or sheet material, and is separated, by the respective at least one connecting point being severed, only before fitting. In a form of this kind, the contact element can be produced in a cost-effective manner in large numbers by way of mass production in particular.

The temporally limited arrangement of a plurality of contact elements within a continuous stamping strip allows in each case a delicate contact segment of a contact element in the form of the wire-like projection to be both mechanically protected and also fully or partially selectively coated in an optional electroplating coating process, for example within a strip electroplating installation. Selective coating of the one exposed end in the form of a contact foot, by means of which electrical contact connection to a contact partner is provided, is feasible. Here, electroplated surfaces, in particular layers which are composed of Ni, Au, Ag, Sn, are feasible on their own or in combination.

BRIEF DESCRIPTION OF THE DRAWINGS

Further advantages, features and details of the invention can be gathered from the following description of preferred exemplary embodiments and also with reference to the drawing, in which.

DETAILE DESCRIPTION

Functionally identical components are respectively identified by the same reference numerals throughout the figures.

Figure 2:
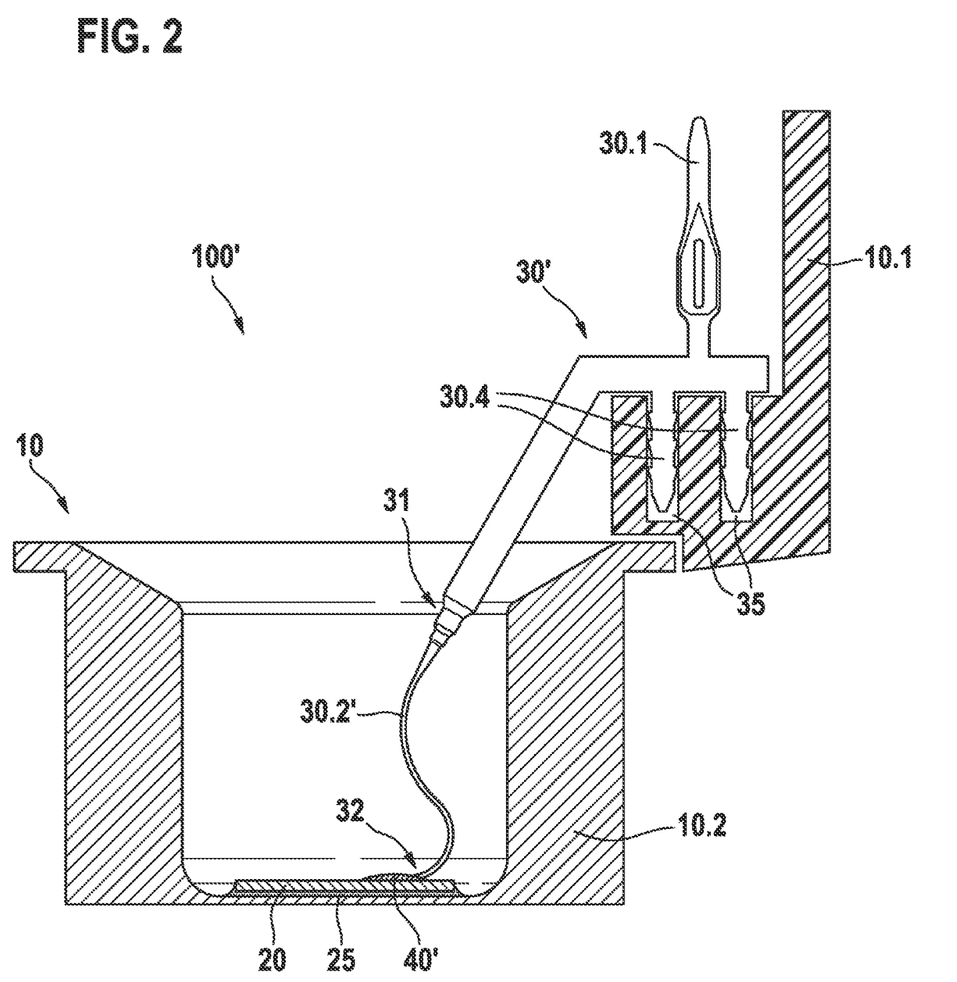
Figure 4:
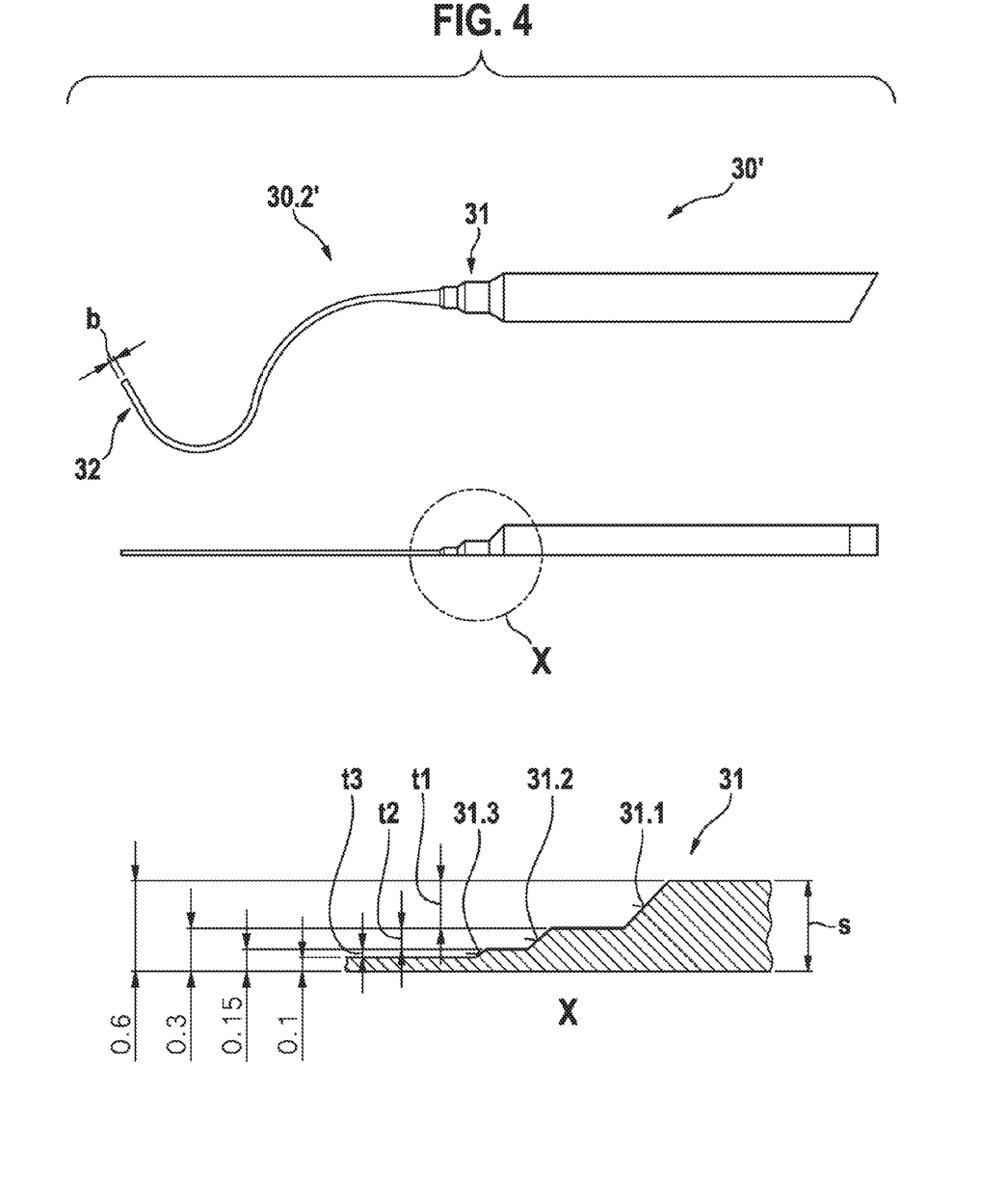
FIG. 4: shows a wire-like projection of a contact element with embossed steps illustrated.

FIG. 2 illustrates a sectioned side view of an ultrasonic sensor 100' which is comparable to that already shown in FIGS. 1a and 1b. For the sake of simplicity, some components are hidden, for example even only a portion of the main housing 10.1 is shown. Furthermore, a sensor element 20, for example a piezo oscillator, is arranged on the base of the membrane pot 10.2. To this end, the sensor element 20 is fixedly connected at the bottom side to the base by means of, for example, an adhesive layer 25. The electrodes which are formed on the top side of the sensor element 20 are now each electrically contact-connected to a contact element 30' according to the invention. The contact element 30' is preferably substantially in the form of a stamped part which is composed of a strip material and/or sheet material. Here, the contact element 30' comprises at least one first contact segment 30.1 which is in the form of a press-in contact for example. Furthermore, the contact element 30' comprises a second contact segment 30.2' which is embodied as a wire-like projection. In this case, the wire-like projection 30.2' is integrally formed with the rest of the main body of the contact element 30' which is composed of the strip material and/or sheet material. FIG. 4 shows the wire-like projection 30.2' of a preferred embodiment of the contact element 30'. Here, the contact element 30' is produced from a strip material and/or sheet material which is composed of an, in particular rolled, bronze alloy, for example of CuSn6. The wire-like projection 30.2' is formed with a curved profile, in particular in an S shape, as a spring element. The profile can be defined by a shaping of the stamping tool and is formed in a plane of the strip material and/or sheet material. One end of the wire-like projection 30.2' adjoins the rest of the solid main body of the contact element 30' in a transition region 31. The other end is, for its part, free of the main body and is in the form of a contact foot 32. The starting material thickness s of the strip material and/or sheet material is provided in a range of from 0.4 mm-0.8 mm and is defined at 0.6 mm for example. A thickness dimension of the strip material and/or sheet material is reduced to an amount of between 0.05 mm and 0.3 mm, for example to 0.1 mm, in the region of the wire-like projection 30.2'. The reduction in the thickness dimension is preferably performed by a single-stage or multi-stage embossing process. FIG. 4 shows an impression by means of a 3-stage embossing process so as to form three embossed steps 31.1, 31.2, 31.3 in the transition region 31. Each embossed step 31.1, 31.2, 31.3 is obtained by a step dimension t1, t2, t3 which is established during the embossing operation. Preferably, t3<t2<t1. By way of example, the thickness dimension is reduced to 0.3 mm by the first step dimension t1 with the formation of the first embossed step 31.1, to 0.15 mm by the second step dimension t2 with the formation of the second embossed step 31.2, and to a final dimension of 0.1 mm by the third step dimension t3 with the formation of the third embossed step 31.3. On account of the increasing shaping operations, the material solidification has a greater value starting from the first embossed step 31.1 to the last embossed step 31.3 respectively. A width dimension b of the wire-like projection 30.2' is preferably provided in a range of from 0.1 mm-0.2 mm and is defined at 0.15 mm for example.

Figure 3:
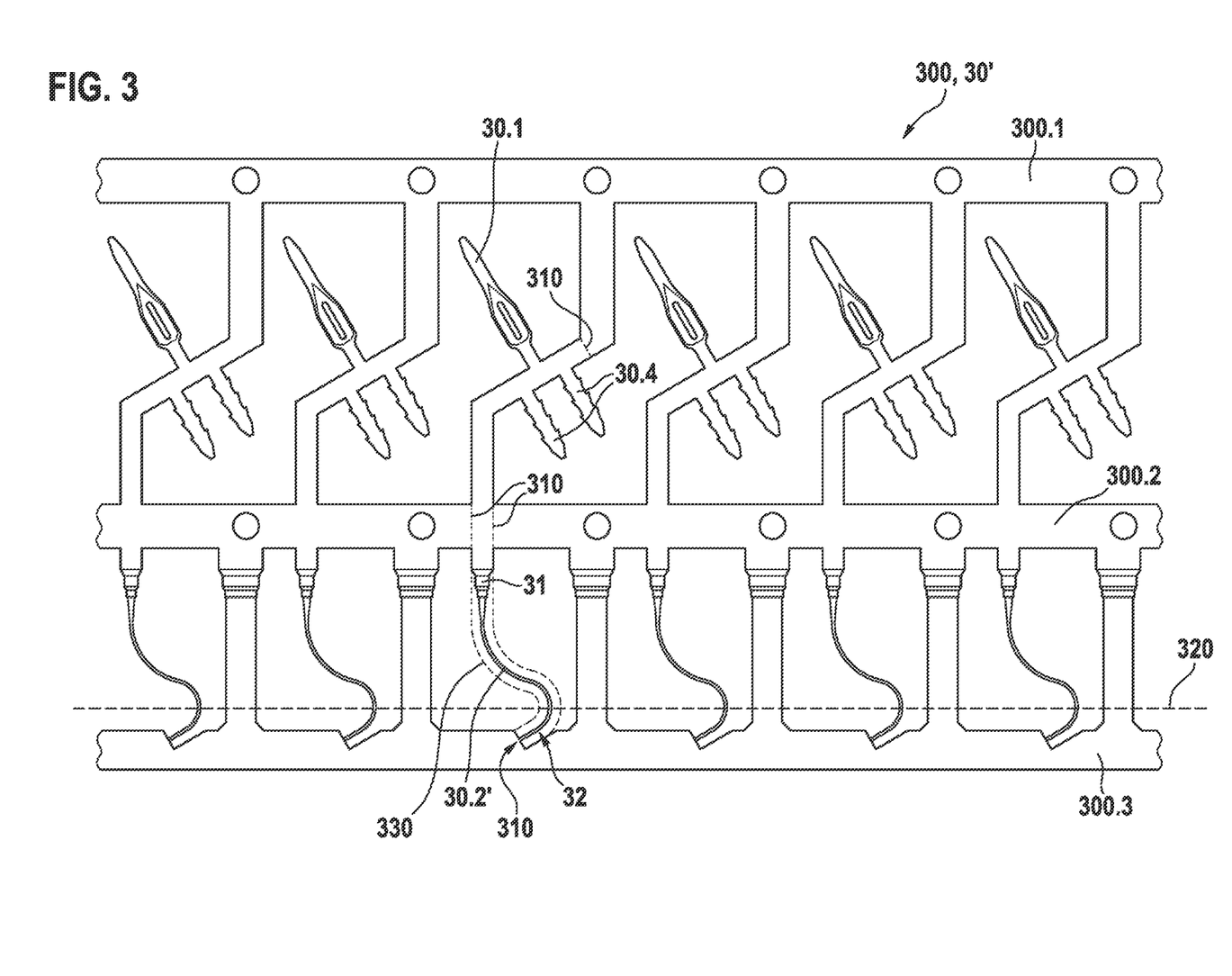
FIG. 3: shows a stamping strip assembly comprising a plurality of contact elements which are held by means of connecting points.

The outer contour of the contact element 30' is preferably manufactured by a stamping operation in a stamping strip. FIG. 3 shows the formation of a plurality of contact elements 30' within a stamping strip assembly 300 of a continuous stamping strip. Here, the outer contour of a respective contact element 30' is already substantially formed, apart from remaining connecting points 300.1, 300.2, 300.3 which are composed of the strip material and/or sheet material, as a result of which the contact elements 30' are held in the stamping strip assembly 300. Said contact elements can be separated, by the connecting points 300.1, 300.2, 200.3 being severed at provided disconnection points 310, only shortly before fitting. The outer contour in the region of the wire-like projection 30.2' is obtained by means of a plurality of stamping-free processes and embodied as an alternative to the abovementioned embossing operations. First, the intended profile, for example a basic S shape, is stamped free as a relatively wide preliminary cut 330 in the stamping strip. This is followed by the first impressing operation to the first embossed step 31.1. Stamping-free is necessary since the material flows through the embossing and "free space" has to be created for this flowing in the stamping strip. The thinner the preliminary cut, the less pressing force is required and the more accurate the result. This is followed by preliminary cutting for the second time (thinner than the first preliminary cut) and subsequent embossing to the second embossed step 31.2. This sequence is then performed for a third time. Finally, the final width b of the wire-like projection is stamped in its end contour. In order to be able to produce the thin structure of the wire-like projection 30.2', auxiliary structures are required in each embossed step 31.1, 31.2, 31.3 under certain circumstances, for example guide holes which are removed with each embossed step 31.1, 31.2, 31.3. With one of the abovementioned stamping operations or with at least one further stamping operation, the outer contour of a joining facility and/or latching facility 30.4 for mechanically fitting the contact element 30' into a housing 10 and/or at least the further contact segment 30.1 is also integrally formed in the strip material and/or sheet material in a respective contact element 30'. The design as a press-in contact is obtained by an additional shaping process by way of which a final shape of the further contact segment 30.1 is formed in a defined manner.

Owing to the manufacture within a continuous stamping strip, the stamping strip assembly 300 can be wound onto and unwound from coil formers (reel-to-reel manufacture). Individual or several stamping and shaping processes can be executed in cycles and/or at the same time or in succession here. The stamping strip optionally passes through a strip electroplating installation in which a lower region 320 of the stamping strip assembly is preferably coated. In this way, at least the contact foot 32 is preferably selectively coated with a layer which is composed of Ni, Au, Ag or Sn. The stamping strip assembly 300 for a fitting process of the individually contained contact elements 30' is preferably transported and provided on the coil formers.

After separation of a contact element 30' from the stamping strip assembly 300, fitting and electrical contact-connection for the purpose of forming an ultrasonic sensor 100', as is illustrated in FIG. 2, can be performed in a very simple manner. To this end, the housing 10, comprising at least the metal diaphragm pot 10.2 and the main body 10.1, together with the sensor element 20 which is fastened in the diaphragm pot 10.2 form a preassembled unit. The contact element 30' is preferably fitted into the housing 10 in an automated manner, for example using a controlled handling unit. The electrical contact-connection of the sensor element 20 to the contact element 30' can now be formed within the sensor housing 10. During fitting of the contact element 30' into the sensor housing 10 by inserting the joining elements and/or latching elements 30.4 into housing openings 35 (for example in the form of blind holes) provided for this purpose, the contact foot 32 of the wire-like projection 30.2' dips into an electrically conductive adhesive which was previously applied to the top side of the sensor element 20 in the region of the electrodes, preferably into a conductive silver adhesive. Said adhesive can hold the contact foot 32 in its upright position on account of adhesion forces. The adhesive is then cured in a subsequent thermal treatment step and as a result the electrical connection between the wire-like projection 30.2' and the sensor element 20 is ensured. As an alternative, the contact foot 32 can be connected to the sensor element 20 by means of a selective soldering process. Furthermore, other connection techniques which are used in general for a wire contact-as used in the embodiment according to FIGS. 1*a* and 1*b*—, such as a welded contact or bonded contact or a thermal compression welded contact for example, are also suitable. In a further fitting process, the sensor element 20 is connected to a sensor electronics unit (not shown) by means of the contact element 30'. To this end, contact is made with, for example, a corresponding printed circuit board by means of the press-in contact 30.1. A complete ultrasonic sensor 100' is preferably used as a park pilot sensor within a motor vehicle.

What is claimed is:

1. A contact element (30'), comprising a main body, which comprises a strip material and/or sheet material, and at least one contact segment (30.1, 30.2') which is connected to the main body and is configured to electrically contact-connect the contact element (30') to a contact partner,
wherein the at least one contact segment (30.2') is a wire-like projection which is integrally formed with the main body, which comprises of the strip material and/or sheet material, and, by way of at least one end of the wire-like projection, forms a transition region (31) which adjoins the main body,
wherein the strip material and/or sheet material is formed from a bronze alloy and, for decoupling from the main body, a thickness dimension of a region of the main body is 4 to 6 times a thickness dimension (s) of the strip material and/or sheet material in a region of the contact segment (30.2'), and a width dimension (b) of the wire-like projection (30.2') has 1 to 2 times the thickness dimension of said wire-like projection, and
wherein at least one embossed step (31.1, 31.2, 31.3) is formed for the purpose of reducing the thickness dimension (s) in a transition region (31).

2. The contact element (30') as claimed in claim 1, characterized in that
the wire-like projection (30.2'), by way of an other end, forms a contact foot (32), which is free from the main body, and which is configured for making contact with the contact partner.

3. The contact element (30') as claimed in claim 2, characterized in that
the contact foot (32) is selectively coated with at least one layer which comprises Ni, Au, Ag and/or Sn.

4. A sensor (100') comprising a sensor housing (10), a piezo oscillator, and a contact element (30') as claimed in claim 2, wherein the contact segment (30.2') makes electrical contact with the sensor element (20) by means of the contact foot (32) of the wire-like projection (32).

5. The sensor (100') as claimed in claim 4, characterized in that
the contact segment (30.2') is cohesively connected to a connection region of the sensor element (20) by means of a soldered connection, adhesive connection, bonded connection or welded connection.

6. The contact element (30') as claimed in claim 1, characterized in that
the strip material and/or sheet material is formed from a rolled bronze alloy.

7. The contact element (30') as claimed in claim 1, characterized in that
the contact segment (30.2') is in the form of a spring element.

8. The contact element (30') as claimed in claim 1, characterized in that
the contact element (30') comprises a joining facility and/or latching facility (30.4) for mechanically fitting the contact element (30') into a housing (10) and/or at least one further contact segment (30.1), wherein the at least one further contact segment (30.1) is in the form of a press-in contact.

9. A sensor (100') comprising a sensor housing (10), a sensor element (20), and a contact element (30') as claimed in claim 1, wherein the contact segment (30.2') makes electrical contact with the sensor element (20).

10. The sensor (100') as claimed in claim 9, characterized in that
the contact segment (30.2') is cohesively connected to a connection region of the sensor element (20).

11. The sensor (100') as claimed in claim 9, characterized in that
the contact element (30') is fitted to the sensor housing (10) by the joining facility and/or latching facility (30.4) and/or the press-in contact (30.1) of the further contact segment makes contact with a printed circuit board.

12. The contact element (30') as claimed in claim 1, characterized in that
the strip material and/or sheet material is formed from rolled CuSn6.

13. The contact element (30') as claimed in claim 1, characterized in that
the contact segment (30.2') is in the form of a spring element, wherein the spring element is formed by a curved profile of the wire-like projection (30.2'), in the form of an S shape.

14. The contact element (30') as claimed in claim 1, wherein the at least one embossed step (31.1, 31.2, 31.3) is formed by a single-stage or multi-stage embossing process.

15. The contact element (30') as claimed in claim 1, characterized in that
a width dimension (b) of the wire-like projection (30.2') has 1.5 times the thickness dimension of said wire-like projection.

16. The contact element (30') as claimed in claim 1, characterized in that the contact element (30'), in a manner integrally formed with the main body, comprises a joining facility and/or latching facility (30.4) for mechanically fitting the contact element (30') into a housing (10) and/or at least one further contact segment (30.1), wherein the at least one further contact segment (30.1) is in the form of a press-in contact.

17. The contact element as claimed in claim 1, wherein the main body comprises a strip material.

18. The contact element as claimed in claim 1, wherein the main body comprises a sheet material.

19. A method for forming a contact element (30')
having a main body and a wire-like projection (30.2') which adjoins the main body and is integrally formed from a strip material and/or sheet material, and the method comprising
obtaining an outer contour of the contact element (30') by at least one cutting process,
reducing a thickness dimension of the strip material and/or sheet material in the region of the wire-like projection (30.2') in comparison to the main body by way of at least one shaping process, and
embossing the strip material and/or sheet material to form at least one embossed step (31.1, 31.2, 31.3) for the purpose of reducing the thickness dimension (s) in a transition region (31),
wherein the strip material and/or sheet material is formed from a bronze alloy and, for decoupling from the main body, a thickness dimension of a region of the main body is 4 to 6 times a thickness dimension (s) of the strip material and/or sheet material in a region of the contact segment (30.2'), and a width dimension (b) of the wire-like projection (30.2') has 1 to 2 times the thickness dimension of said wire-like projection.

20. The method as claimed in claim 19,
characterized in that
the outer contour and the thickness dimension in the region of the wire-like projection (30.2') are obtained by means of a multi-stage cutting and shaping process, wherein a preliminary contour is formed as the wider preliminary cut (330) of the outer contour at least in a first cutting process and an end contour of the outer contour is formed at least in a last cutting process, and wherein, after the first cutting process and before the last cutting process, the thickness dimension is reduced starting from a first shaping process, over a plurality of step dimensions (t1, t2, t3), down to an end dimension in the last shaping process, wherein the step dimensions (t1, t2, t3) are decreased with each subsequent shaping process.

21. The method as claimed in claim 19,
characterized in that
the cutting process is performed by a stamping operation and/or the shaping process is performed by an embossing operation.

22. The method as claimed in claim 19,
characterized in that
a plurality of contact elements (30') are formed in the form of a stamping strip assembly (300) in a continuous stamping strip, wherein each contact element (30') is held in the stamping strip assembly (300) by means of at least one connecting point (300.1, 300.2, 300.3) which comprises is the strip material and/or sheet material, and is separated, by the respective at least one connecting point (300.1, 300.2, 300.3) being severed, only before fitting.

\* \* \* \* \*